(12) United States Patent
Cagliari et al.

(10) Patent No.: US 7,520,070 B2
(45) Date of Patent: Apr. 21, 2009

(54) SPORTS BOOT FOR A BOARD FOR GLIDING

(75) Inventors: Peter Cagliari, Montebelluna (IT); Andrea Fregoni, Paese (IT)

(73) Assignee: Lange International S.A., Geneva (CH)

( * ) Notice: Subject to any disclaimer, the term of this patent is extended or adjusted under 35 U.S.C. 154(b) by 252 days.

(21) Appl. No.: 10/804,606

(22) Filed: Mar. 19, 2004

(65) Prior Publication Data

US 2004/0187354 A1    Sep. 30, 2004

(30) Foreign Application Priority Data

Mar. 24, 2003   (CH) ...................... 0498/03

(51) Int. Cl.
*A43B 5/04* (2006.01)
*A43B 7/14* (2006.01)

(52) U.S. Cl. .................. 36/117.1; 36/117.6; 36/115

(58) Field of Classification Search ............ 36/117.1 X, 36/117.6 X, 115 X, 119.1, 118.2, 89, 92, 36/109

See application file for complete search history.

(56) References Cited

U.S. PATENT DOCUMENTS

| | | | |
|---|---|---|---|
| 5,667,737 A | 9/1997 | Wittmann | |
| 6,079,128 A * | 6/2000 | Hoshizaki et al. | 36/89 |
| 6,457,265 B1 * | 10/2002 | Lepage et al. | 36/117.1 |
| 6,499,233 B1 * | 12/2002 | Chenevert | 36/55 |
| 6,871,424 B2 * | 3/2005 | Labonte et al. | 36/115 |
| 6,938,362 B2 * | 9/2005 | Saillet et al. | 36/117.3 |
| 2001/0018805 A1 | 9/2001 | Basso | |
| 2002/0062579 A1 * | 5/2002 | Caeran | 36/115 |

FOREIGN PATENT DOCUMENTS

| | | |
|---|---|---|
| EP | 0 808 708 A | 11/1997 |
| EP | 0 903 087 A | 3/1999 |
| FR | 2 766 065 A | 1/1999 |
| WO | WO 02/087371 | 11/2002 |

* cited by examiner

*Primary Examiner*—Jila M Mohandesi
(74) *Attorney, Agent, or Firm*—Frommer Lawrence & Haug LLP; Ronald R. Santucci

(57) ABSTRACT

The sports boot has, on the one hand a first part (1) in a first material and a second part (17) superposed on said first part and in a second material, and, on the other hand, reinforcement means (10, 11, 12, 13). The reinforcement means are at least partly formed by at least one frame (13) in synthetic material reinforced with mineral or synthetic fibers and positioned at least partially between said parts.

14 Claims, 2 Drawing Sheets

SPORTS BOOT FOR A BOARD FOR GLIDING

This application claims priority benefits from Swiss Patent Application No. 0498/03filed Mar. 24, 2003.

BACKGROUND OF THE INVENTION

The invention relates to a sports boot, particularly for a board for gliding such as a ski or snow board, or skating boot, having a first part in a first material and a second part superposed on said first part and in a second material, and, on the other hand, reinforcement means.

PRIOR ART

A boot of this type is known from patent application EP 0 903 087, the content of which is incorporated by reference. In that earlier application, the object of the invention was to improve a boot with a rigid core directly in contact with a comfort liner in terms of the transmission of forces between the foot and, in particular, the ski, and the precision of guiding the ski. This improvement was afforded by reinforcements formed, particularly, by an excess thickness of the rigid core, reinforcements placed at the locations of the boot transmitting significant forces. These reinforcements form a general bracing structure improving rear bearing and the transmission of lateral forces.

Furthermore, ski boots are known that comprise a rigid inner core surrounded by a flexible outer part. In the case of patent FR 2 119 653, the content of which is incorporated by reference, the flexible outer part, which is resistant to wear and to abrasion, is for protecting the inner part of the boot. In the case of the boot according to patent U.S. Pat. No. 5,588,228, the content of which is incorporated by reference, the rigid inner core is cut so as to form a triangulate rigid structure having the general shape of an inverted "Y".

SUMMARY OF THE INVENTION

An object of the present invention is to reduce the weight and thickness of the reinforced zones without reducing their rigidity.

The sports boot according to the invention is noteworthy in that the reinforcement means are at least partly formed by at least one frame in synthetic material reinforced with mineral or synthetic fibers.

The fibers are, for example, carbon, glass or KEVLAR® fibers, which are preferably woven. These fibers are embedded in a heat-curable or thermoplastic synthetic material, preferably in the same polyurethane as the polyurethane constituting the rigid core such that perfect adhesion is guaranteed between the rigid core and the reinforcements.

Preferably, the frame consists of a strip produced flat and then heat-molded to give it the desired shape. This preformed strip is preferably arranged on the outside of the rigid core and under the flexible core.

The frame may or may not be covered by the envelope of flexible material. Preferably, it is covered if it is not very resistant to abrasion or placed in zones that may be subject to aggressive action.

BRIEF DESCRIPTION OF THE DRAWINGS

The appended drawing shows, by way of example, an embodiment of a boot according to the invention.

DESCRIPTION OF THE PREFERRED EMBODIMENT

Figure 1:
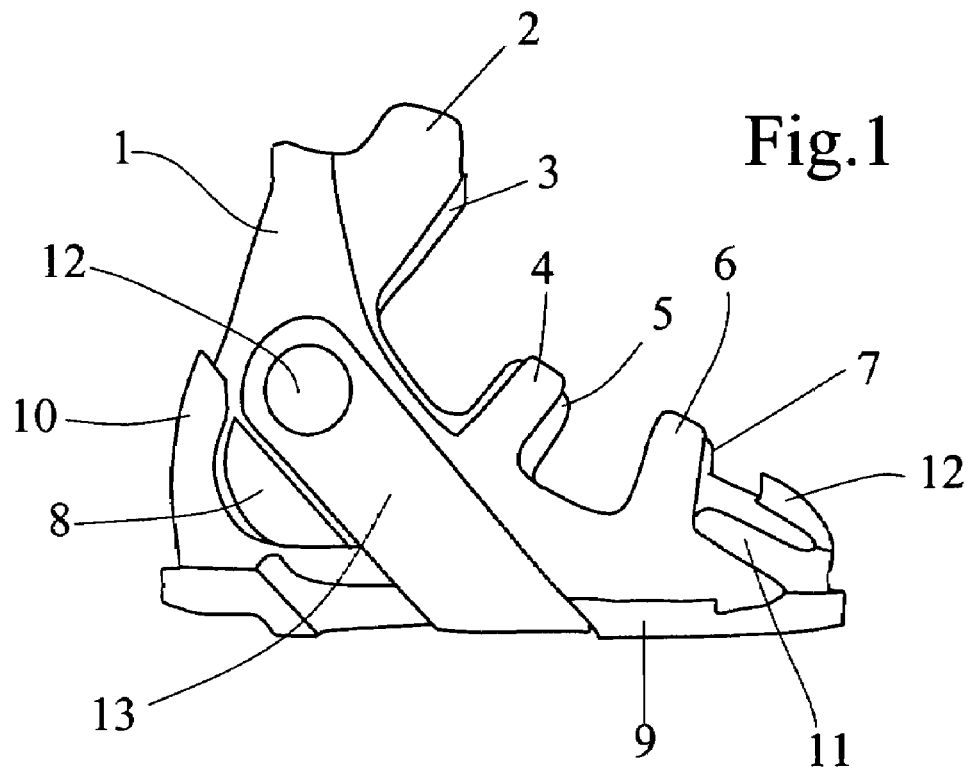
FIG. 1 is a side view of a rigid core of part of a ski boot.

The rigid core 1 shown in FIG. 1 is preferably in polyurethane. It has the form of a cut, perforated shell. It is open on the top so as to have two flaps 2 and 3 in its upper part, a pair of tongues 4, 5 in the lower zone of the instep and a pair of tongues 6, 7 in the zone of the front of the foot. These tongues are for receiving means for closing and tightening the boot, such as buckles. The rigid core 1 also has two lateral perforations 8 extending rearward and below the foot's ankle zone. The rigid core 1 also comprises a sole 9 forming the largest part of the boot sole, a rear reinforcement 10 rising from the heel zone, a reinforcement 11 formed at the front, on the outer side of the boot, and a reinforcement 12 formed on the front end of the rigid core. The reinforcements 10, 11, and 12 are formed by excess thicknesses of the material of the rigid core, as in the case of the boot according to EP 0 903 087. The reinforcement 11 serves primarily as a pole deflector for slalom competitions. The rigid core 1 also has, on each side of the ankle zone, cylindrical excess thicknesses 12 surrounded by the ends of a frame 13 formed from a rigid strip of synthetic material reinforced with mineral or synthetic fibers, preferably carbon, glass or KEVLAR® fibers that are woven and embedded in a matrix of polyurethane compatible with the polyurethane of the rigid core.

Figure 2:
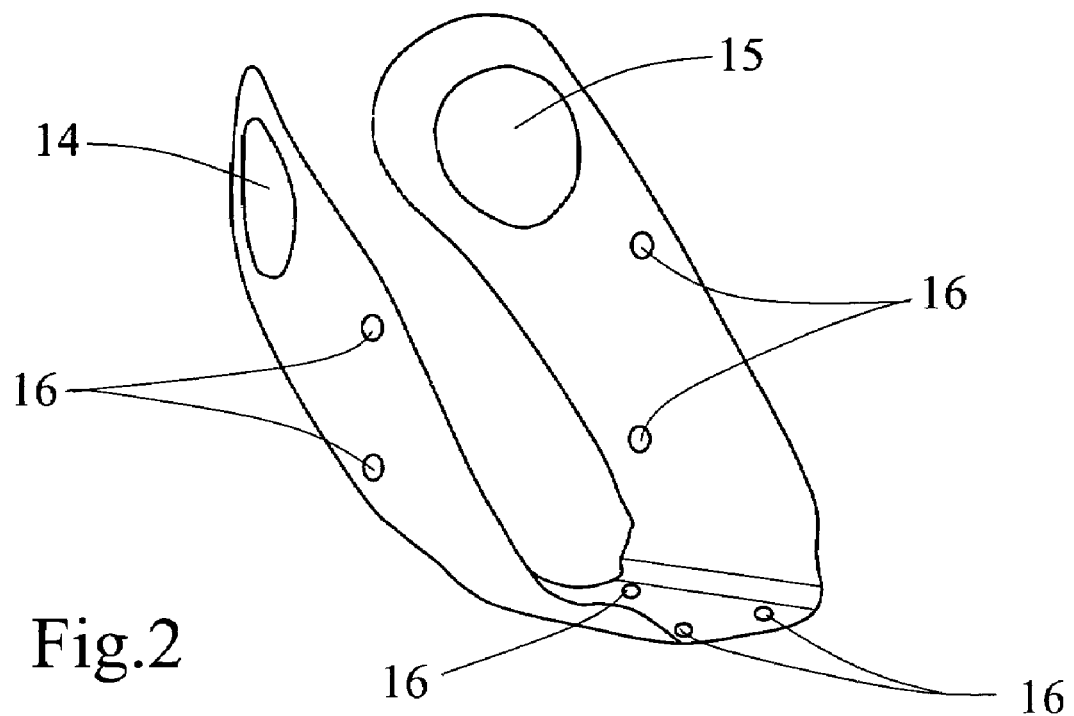
FIG. 2 is a perspective view of the diagonal frame with which the rigid core of FIG. 1 is equipped.

This frame 13 is shown in FIG. 2 prior to its combination with the rigid core. It is formed by heat-molding the reinforced matrix. The frame 13 is then arranged in the mold of the rigid core 1 before this core is injection-molded. In order to guarantee a perfect join between the rigid core 1 and the frame 13, a join already guaranteed by the compatibility of the materials, the frame 13 also has two circular cutouts 14 and 15 at its ends, and also holes 16 into which the polyurethane injected to form the rigid core penetrates so as to further guarantee mechanical anchoring. The projections 12 of the rigid core are thus formed by the presence of the cutouts 14 and 15. The excess thicknesses formed by the projections 12 have the principal function of supporting the lower leg part of the boot, as will be described below.

The rigid core, provided with its frame 13, is then covered with a flexible envelope 17 (FIG. 3), also in polyurethane. The rigid core 1 is not entirely covered by the flexible envelope 17. The zones not covered are hatched in FIG. 3. In particular, the excess thicknesses 10, 11, and 12, and also the front and rear parts of the sole 9 are not covered. The same applies to the fiber parts in the zone of the frame 13, which are not covered either.

The polyurethane of the rigid core 1 has, for example, a Shore hardness D of 64 and the envelope 17 a Shore hardness D of 50.

Figure 3:
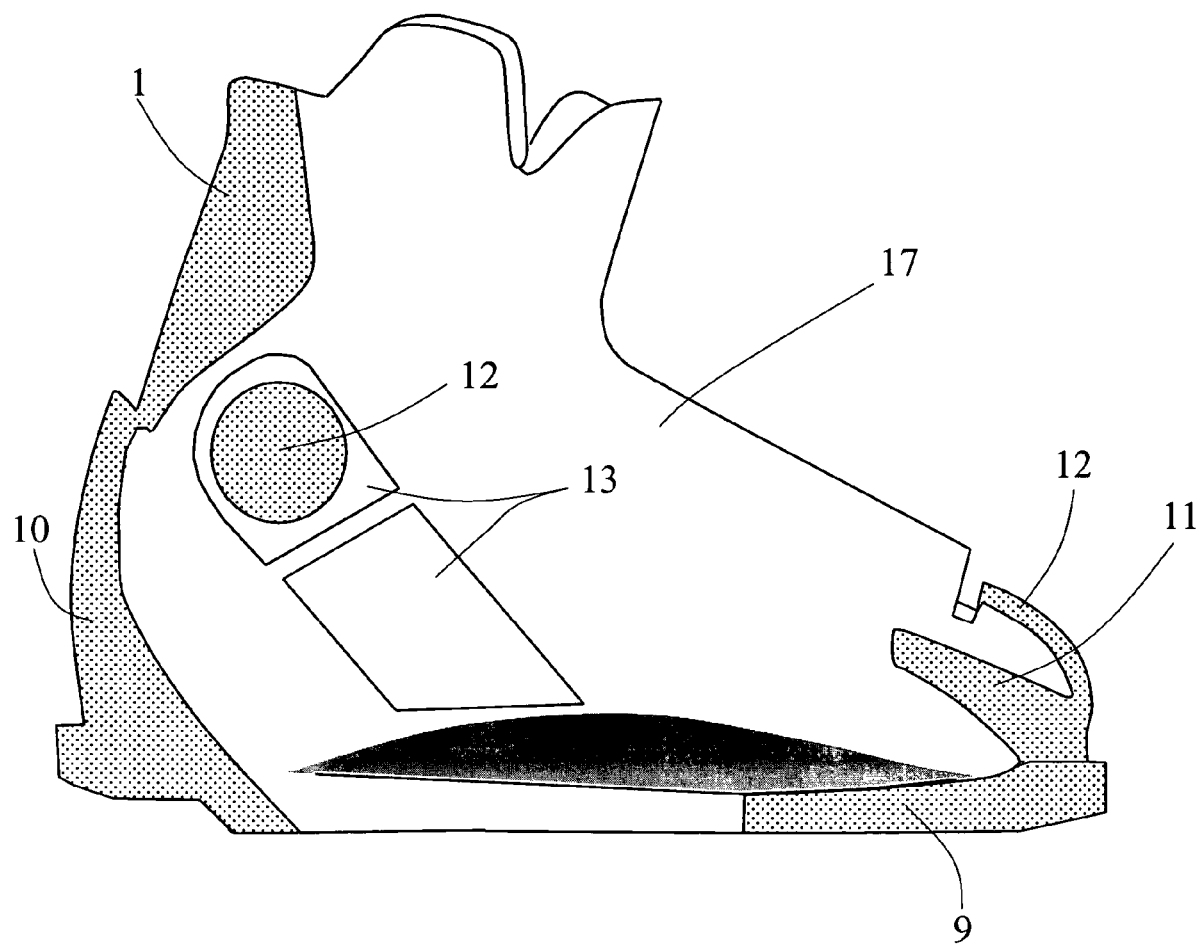
FIG. 3 shows the rigid core of FIG. 1 provided with its envelope in flexible material.

The boot part shown in FIG. 3 is supplemented by the lower leg part of the boot (not shown), articulated to the part shown. This lower leg part may be manufactured in the same way as the boot part shown, constituting the shell. The articulation is achieved by means of rivets passing through the reinforced zones 12.

The boot part shown is, naturally, only an illustrative embodiment. The rigid core does not necessarily have to have parts reinforced by excess thicknesses. The frame in fiber-reinforced synthetic material could be arranged differently on the rigid part. It could, for example, form a stirrup piece passing over the reinforced part 10 and extending obliquely toward the front on each side in the direction of the sole.

What is claimed:

1. A sports boot for a board for gliding, such as a snow board, or skating boot comprising a rigid core (1) constituting, in certain zones, the inner face of the boot that receives a comfort liner; an envelope (17) of flexible material covering at least partially the rigid core (1) and itself constituting the inner face of the boot in the zones where the rigid core is absent; and a reinforcement means (10, 11, 12, 13) at least partly formed by at least one frame (13) in synthetic material internally reinforced with mineral or synthetic fibers that are embedded in a matrix, and positioned at least partially between said rigid core and said envelope wherein said frame is partially covered by said envelope.

2. The boot as claimed in claim 1, wherein the synthetic material of the frame is thermoplastic.

3. The boot as claimed in claim 1, wherein the synthetic material of the frame is heat-moldable.

4. The boot as claimed in claim 1, wherein the synthetic material of the frame is heat-curable.

5. The boot as claimed in claim 1, wherein the fibers are in the form of textile layers.

6. The boot as claimed in claim 5, wherein the fibers are of carbon or KELVAR®, or glass fibers.

7. The boot as claimed in claim 1, wherein the frame is formed by the combination of a number of textile layers of identical or different fibers.

8. The boot as claimed in claim 6, wherein the fibers are superposed or woven.

9. The boot as claimed in claim 1, wherein the frame (13) is covered by the flexible envelope.

10. The boot as claimed in claim 1, wherein the frame (13) is not at least partly covered by the flexible envelope (17).

11. The boot as claimed in claim 1, wherein the frame (13) extends transversely under the rigid core, between heel and toe, and obliquely rearward, on each side the rigid core.

12. The boot as claimed in claim 1, wherein the rigid core (1) comprises the frame (13) extending above the heel and obliquely toward the bottom and the front of each side of the rigid core.

13. The boot as claimed in claim 1, wherein the rigid core is in injected plastic material, and the envelope is in over-injected plastic material.

14. A sports boot for a board for gliding, such as a snow board, or skating boot comprising a rigid core (1) constituting, in certain zones, the inner face of the boot that receives a comfort liner; an envelope (17) of flexible material covering at least partially the rigid core (1) and itself constituting the inner face of the boot in the zones where the rigid core is absent; and a reinforcement means (10, 11, 12, 13), wherein the reinforcement means are at least partly formed by at least one frame (13) comprising a thermoplastic or heat-curable matrix in synthetic material internally reinforced with mineral or synthetic fibers, and positioned at least partially between said rigid core and said envelope wherein said frame is partially covered by said envelope.

* * * * *